(12) United States Patent
Li et al.

(10) Patent No.: US 10,558,111 B2
(45) Date of Patent: Feb. 11, 2020

(54) HANDHELD STABILIZER (71) Applicant: Guangdong Sirui Coptical Co., Ltd., Zhongshan (CN)

(72) Inventors: Jie Li, Zhongshan (CN); Peng Chu, Zhongshan (CN); Changyong Xu, Zhongshan (CN)

(73) Assignee: Guangdong Sirui Optical Co., Ltd., Zhongshan (CN)

( * ) Notice: Subject to any disclaimer, the term of this patent is extended or adjusted under 35 U.S.C. 154(b) by 0 days.

(21) Appl. No.: 15/566,720

(22) PCT Filed: Jul. 14, 2016

(86) PCT No.: PCT/CN2016/089982
§ 371 (c)(1),
(2) Date: Nov. 10, 2018

(87) PCT Pub. No.: WO2017/215064
PCT Pub. Date: Dec. 21, 2017

(65) Prior Publication Data
US 2019/0137852 A1 May 9, 2019

(30) Foreign Application Priority Data
Jun. 16, 2016 (CN) .......................... 2016 1 0445963

(51) Int. Cl.
*F16M 13/04* (2006.01)
*G03B 17/56* (2006.01)
(Continued)

(52) U.S. Cl.
CPC ........... *G03B 17/563* (2013.01); *F16M 11/08* (2013.01); *F16M 11/205* (2013.01);
(Continued)

(58) Field of Classification Search
CPC ......... G03B 17/56; F16M 13/00; F16M 13/04
(Continued)

(56) References Cited

U.S. PATENT DOCUMENTS

| 2013/0176412 | A1 | 7/2013 | Chen |
| 2016/0252799 | A1* | 9/2016 | Li .......................... F16M 11/28 396/425 |

FOREIGN PATENT DOCUMENTS

| CN | 203522885 | 4/2014 |
| CN | 204406015 U | 6/2015 |

(Continued)

OTHER PUBLICATIONS

European Patent Office, Extended European Search Report, dated May 18, 2018, 8 pages.
(Continued)

*Primary Examiner* — Clayton E. LaBalle
*Assistant Examiner* — Fang-Chi Chang
(74) *Attorney, Agent, or Firm* — Loeb & Loeb LLP (57) ABSTRACT

A handheld stabilizer comprises a handle provided with a handheld portion and a connecting portion. The stabilizer includes a ball head mechanism mounted between the connecting portion and a photographing device and adapted for adjusting the position of the photographing device. A control mechanism is adapted for controlling the motion of the ball head mechanism after receiving a location signal from the photographing device indicating that one or more human faces are not centered within a predefined location range in a screen of the photographing device. The control mechanism adjusts the position of the photographing device causing the one or more human faces to be centered within the predefined location range in the screen of the photographing device, so that a photographing function that tracks human faces is realized.

15 Claims, 8 Drawing Sheets (51) Int. Cl.
*F16M 11/08* (2006.01)
*F16M 11/20* (2006.01)

(52) U.S. Cl.
CPC ..... *F16M 11/2057* (2013.01); *F16M 11/2064* (2013.01); *F16M 11/2071* (2013.01); *F16M 13/04* (2013.01); *F16M 2200/024* (2013.01); *F16M 2200/041* (2013.01); *F16M 2200/042* (2013.01)

(58) Field of Classification Search
USPC .................................................. 396/419, 421
See application file for complete search history.

(56) References Cited

FOREIGN PATENT DOCUMENTS

| | | |
|---|---|---|
| CN | 204420520 | 6/2015 |
| CN | 105090695 A | 11/2015 |
| CN | 204758996 U | 11/2015 |
| CN | 204805905 | 11/2015 |
| CN | 105443956 A | 3/2016 |
| CN | 105592267 A | 5/2016 |
| CN | 105611161 A | 5/2016 |
| CN | 205304911 U | 6/2016 |

OTHER PUBLICATIONS

Kai Man Wong, DJI Osmo Review: 4K Video With 3-Axis Stabilisation—DigialRev, Digitalrev.com, retrieved on May 4, 2018.
Chinese National Intellectual Property Administration, First Office Action of CN201610445963.1, dated Sep. 4, 2017, 8 pages.
Chinese National Intellectual Property Administration, Second Office Action of CN201610445963.1, dated May 11, 2018, 7 pages.
Chinese National Intellectual Property Administration, Second Office Action of CN201610445963.1, dated Nov. 23, 2018, 6 pages.
Chinese National Intellectual Property Administration, Third Office Action of CN201610445963.1, dated Nov. 23, 2018, 6 pages.
European Patent Office, Supplementary European Search Report, dated May 4, 2018, 2 pages.

\* cited by examiner

HANDHELD STABILIZER

CROSS REFERENCE OF RELATED APPLICATIONS

The present invention is a US national stage of a PCT international application, serial no. PCT/CN/2016/089982, filed on Jul. 14, 2016, which claims the priority of Chinese patent application No. 201610445963.1 filed to SIPO of China on Jun. 16, 2016 having an invention title of "a handheld stabilizer", the entire content of these applications are incorporated into the present application by reference herein.

TECHNICAL FIELD

The present invention relates to the technical field of handheld devices for photographing or videotaping, in particular relates to a handheld stabilizer.

BACKGROUND TECHNOLOGY

Along with the advancement and development of times, people have increasing demands for photographing or videotaping by using a photographing device. Various selfie sticks have emerged in prior arts to be used as an auxiliary tool of the photographing device. However, these selfie sticks cannot compensate for human hand tremble, and have poor photographing effect. Besides, these selfie sticks only have simple structures and cannot automatically track human faces when photographing, so when continuous photographing needs to be carried out on a person in motion, the user's hand is required to move back and forth continuously to adjust the focusing alignment, in order to keep the photographed human face located at a suitable position in the screen of the photographing device, and this causes operation inconvenience.

Stabilizers have emerged in prior arts to be used as an auxiliary tool of the photographing device. The stabilizer normally has two axes, either of the axes has a corresponding motor for driving and adjusting rotation position. Once the balance of the camera is broken, a central processing unit would analyze an internal gyroscope in the stabilizer. The feedback signal from sensors such as an accelerated speed sensor and a magnetic field sensor is processed by corresponding correcting algorithms to form corrected signal to control said motors to finally reach a corrected balance position. Chinese patent literature CN204758996U discloses such a handheld stabilizer. Although it can be used for photographing or videotaping, it does not have an automated tracking photographing function, so when continuous photographing needs to be carried out on a person in motion, the position of the photographing device needs to be manually adjusted to be aligned with the photographed person, and this is tiring after long time operation, which negatively influences the photographing effect. Besides, the stabilizer disclosed in this patent literature cannot be used with a rear camera of a cell phone to do high quality selfies.

Chinese patent literature CN105611161A discloses a photographing control method, a photographing control apparatus and a photographing system. The disclosed photographing method controls the selfie stick to rotate only when there is a human side face captured in the distorted area of the electronic device, with the purpose of removing the distortion of a human side face captured in the distorted area and thus improving the photographing quality. However, when tracked photographing needs to be carried out on a person in motion, the technical scheme in this patent literature still cannot solve the problem in prior arts that the position of the photographing device needs to be manually adjusted to be aligned with the photographed person, such manual adjustment is tiring after long time operation and the photographing effect is poor, as well as the problem that it cannot be used with a rear camera of a photographing device to do high quality selfies.

SUMMARY OF THE INVENTION

Therefore, the problem to be solved by the present invention is how to overcome the technical defects in prior arts that manual adjusting of a photographing device is required to align the position of the photographing device with a photographed person and such manual adjustment is tiring after long time operation and the photographing effect is poor, accordingly, the present invention provides a handheld stabilizer that does not require manual adjusting of the position of a photographing device and is able to track human faces when photographing, with a good photographing effect.

In this respect, the present invention provides a handheld stabilizer that comprises a handle, having a handheld portion and a connecting portion connected to the handheld portion;

a ball head mechanism, mounted between the connecting portion and a photographing device and adapted for adjusting the position of the photographing device;

a control mechanism, adapted for controlling the motion of the ball head mechanism after receiving a location signal from the photographing device indicating that one or more human faces are not centered within a predefined location range in a screen of the photographing device, thereby adjusting the position of the photographing device to cause the one or more human faces to be centered within the predefined location range in the screen of the photographing device.

As a preferred technical scheme, the control mechanism is adapted for receiving the location signal by Blue-tooth, wireless transmission, or data cable.

As a preferred technical scheme, the ball head mechanism comprises a holder, adapted for fastening the photographing device;

a support rod, one end of which is connected to the connecting portion in a rotatable manner by a first rotation unit, and the other end of which is connected to the holder in a rotatable manner by a second rotation unit; and when controlling the motion of the ball head mechanism, the control mechanism is adapted for controlling the first rotation unit to drive the support rod to rotate relative to the handle, and/or controlling the second rotation unit to drive the holder to rotate relative to the support rod.

As a preferred technical scheme, the control mechanism comprises a chip, a power source, a mode switch and a manual control switch, wherein, the power source, the mode switch and the manual control switch are respectively electrically connected to the chip; the mode switch is adapted for controlling the chip to activate an automatic tracking mode or a manual tracking mode; when the chip activates the automatic tracking mode, the chip is adapted for automatically controlling the motion of the first rotation unit and/or the second rotation unit according to the received location signal; and when the chip activates the manual tracking mode, the chip is adapted for controlling the motion of the first rotation unit and/or the second rotation unit by operation of the manual control switch.

As a preferred technical scheme, the control mechanism further comprises a photograph-taking switch adapted for controlling the photographing device to take a photograph, and a video-taking switch adapted for controlling the photographing device to take a video.

As a preferred technical scheme, the support rod is axially substantially perpendicular to the handle, and during the rotation of the support rod driven by the first rotation unit controlled by the control mechanism, the support rod is always kept axially substantially perpendicular to the handle.

As a preferred technical scheme, the holder is axially substantially perpendicular to the support rod, and during the rotation of the holder driven by the second rotation unit controlled by the control mechanism, the holder is always kept axially substantially perpendicular to the support rod.

As a preferred technical scheme, the handheld portion has a hollow inner chamber, the control mechanism is mounted inside the hollow inner chamber, with one or more of the mode switch, the manual control switch, the photograph-taking switch and the video-taking switch provided on a side wall of the handheld portion.

As a preferred technical scheme, one side of the handheld portion is provided with texture for handholding; one or more of the manual control switch, the photograph-taking switch and the video-taking switch are arranged on the opposite side of the texture; and/or, the mode switch is arranged on the same side of the texture.

As a preferred technical scheme, the handheld portion is connected to the connecting portion in a rotatable manner by a damping shaft.

As a preferred technical scheme, the handheld stabilizer further comprises a mounting base connected to the connecting portion in a rotatable manner by the first rotation unit, with one end of the support rod mounted on the mounting base in a rotatable manner by a rotation shaft, the support rod has a first mounting position and a second mounting position on the mounting base; at the first mounting position, the support rod is axially substantially perpendicular to the handle, thereby forming a working state; at the second mounting position, the support rod is axially substantially parallel to the handle, thereby forming a folded state.

As a preferred technical scheme, the handheld stabilizer further comprises a locking mechanism adapted for locking the support rod at the first mounting position or at the second mounting position, the locking mechanism comprises an accommodation space on the mounting base, with a first inner sidewall and a second inner sidewall spaced in the axial direction of the rotation shaft; a main body, mounted inside the accommodation space and provided with a first planar surface facing the first inner sidewall and a second planar surface facing the second inner sidewall, the distance between the first planar surface and the second planar surface being shorter than the distance between the first inner sidewall and the second inner sidewall; a locking button, mounted on the first planar surface; a locking hole, provided in the mounting base and in communication with the accommodation space for the locking button to extend out therefrom; an elastic member, mounted between the second planar surface and the second inner sidewall; a first blocking member, provided on the main body; at least two second blocking members, provided on the support rod; when the locking button is pressed, the first blocking member is adapted for breaking away from the second blocking member to cause the support rod freely rotatable around the rotation shaft while the elastic member is being compressed; and the first blocking member is aligned with the second blocking member when the support rod arrives at the first mounting position or the second mounting position, and then by releasing the locking button, the main body is moved under an elastic force acted by the elastic member so as to move the first blocking member into engagement with the second blocking member, thereby locking the support rod at the first mounting position or at the second mounting position.

As a preferred technical scheme, the first blocking member is a blocking tooth, the second blocking members are blocking grooves formed for receiving the blocking tooth therein, and the blocking grooves each have two opposite blocking surfaces distributed along a circumferential direction around the rotation shaft.

As a preferred technical scheme, the holder is provided with a holding slot for fastening the photographing device, and when the support rod is at the second mounting position, the holding slot faces the handle and receives part of the handle therein.

As a preferred technical scheme, the holder comprises a holding member provided with the holding slot, and a holder base connected to the support rod in a rotatable manner by the second rotation unit.

The handheld stabilizer provided by the present invention has the following advantages:

In the handheld stabilizer of the present invention, the photographing device is mounted on the connecting portion of the handle via the ball head mechanism, when the control mechanism receives a location signal from the photographing device indicating that one or more human faces are not centered within a predefined location range (such as the middle center) in a screen of the photographing device, the control mechanism controls the motion of the ball head mechanism to adjust the position of the photographing device so as to cause the one or more human faces centered within the predefined location range in the screen of the photographing device, so that a photographing function that tracks human faces is realized. As compared to prior arts, not only the operation is easy and not tiring, but also a good photographing effect can be achieved. When people use the handheld stabilizer of the present invention to do photographing, he/she is not required to look at the screen of the photographing device, and is only required to face the camera (such as a rear camera of a cell phone) in order to take photos or videos with high quality.

In the handheld stabilizer of the present invention, the ball head mechanism comprises a holder and a support rod, one end of the support rod is connected to the connecting portion of the handle in a rotatable manner by a first rotation unit, and the other end of the support rod connected to the holder in a rotatable manner by a second rotation unit. The first rotation unit can be controlled by the control mechanism to drive the support rod to rotate relative to the handle. The second rotation unit can be controlled by the control mechanism to drive the holder to rotate relative to the support rod. The photographing device is mounted on the holder. When the control mechanism receives the human face location signal (indicating that one or more human faces are not centered within a predefined location range in the screen of the photographing device) from the photographing device, the operation of the first rotation unit and/or the second rotation unit can be controlled to adjust the one or more human faces to a location centered within the predefined location range in the screen of the photographing device, thereby realizing the photographing function that tracks human faces.

In the handheld stabilizer of the present invention, the control mechanism comprises a chip, to which a power source, a mode switch and a manual control switch are respectively electrically connected. When the chip is controlled by the mode switch to activate the automatic tracking mode, the chip may automatically control the motion of the first rotation unit and/or the second rotation unit according to the received location signal. When the chip is controlled by the mode switch to activate the manual tracking mode, the chip may no longer automatically control the motion of the first rotation unit and/or the second rotation unit according to the received location signal, instead, the chip controls the motion of the first rotation unit and/or the second rotation unit according to the operation of the manual control switch. Such arrangement has some advantages, for example, when there is no human face in the display screen of the photographing device, the manual tracking mode can be used to find a human face first, and then the automatic tracking mode can be activated to perform tracked photographing; of course, the manual tracking mode can also be used throughout the process to perform tracked photographing. Such arrangement makes the handheld stabilizer of the present invention have various operation methods suitable to be used by people having various preferences.

In the handheld stabilizer of the present invention, the support rod is axially substantially perpendicular to the handle, and during the rotation of the support rod driven by the first rotation unit controlled by the control mechanism, the support rod is always kept axially substantially perpendicular to the handle. Such arrangement facilitates rotation adjustment in the left and right direction of the photographing device mounted on the support rod through the holder, thereby realizing automatic tracking in the left and right direction. The holder is axially substantially perpendicular to the support rod, and during the rotation of the holder driven by the second rotation unit controlled by the control mechanism, the holder is always kept axially substantially perpendicular to the support rod. Such arrangement facilitates rotation adjustment in the high and low direction of the photographing device mounted on the holder, thereby realizing automatic tracking in the high and low direction.

In the handheld stabilizer of the present invention, one side of the handheld portion is provided with texture for handholding; one or more of the manual control switch, the photograph-taking switch and the video-taking switch is arranged on the opposite side of the texture. People usually hold the texture portion with the four fingers except the thumb, and put the thumb on the opposite side. The arrangement of the present invention meets people's usual habits, and it is convenient to use the thumb to frequently operate one or more of the manual control switch, the photograph-taking switch and the video-taking switch. The mode switch with a lower operation frequency is arranged on the same side of the texture, so as to avoid crowdedness caused by arranging all the switches on the opposite side of the texture, and the other four fingers can be used for operation of mode switching.

In the handheld stabilizer of the present invention, the handheld portion is connected to the connecting portion in a rotatable manner by a damping shaft. This makes it convenient to adjust the rotation angle of connecting portion connected with the support rod relative to the handheld portion, for adjustment into the most comfortable holding posture.

In the handheld stabilizer of the present invention, the support rod is mounted on the connecting portion through the mounting base and has a first mounting position and a second mounting position. At the first mounting position, the support rod is axially substantially perpendicular to the handle, which facilitates photographing. At the second mounting position, the support rod is axially substantially parallel to the handle, the entire handheld stabilizer occupies little space at this state, which is easy to be accommodated and beneficial for protecting the handheld stabilizer from being damaged due to collision or compression.

The handheld stabilizer of the present invention further comprises a locking mechanism that can lock the support rod at the first mounting position or at the second mounting position, thereby making its working state or folded state more stable.

BRIEF DESCRIPTION OF THE DRAWINGS

In order to more clearly describe the technical schemes in the specific embodiments of the present invention or in the prior art, hereinafter, the accompanying drawings required to be used in the description of the specific embodiments or the prior art will be briefly introduced. Apparently, for those skilled in the art, without expenditure of creative labor, other drawings can be derived on the basis of these accompanying drawings.

REFERENCE NUMERALS

1—handle
10—hollow inner chamber
11—handheld portion
12—connecting portion
13—threaded mounting hole
2—holder
20—holding slot
21—holding member
22—holder base
3—support rod
31—rotation shaft
4—first rotation unit
41—first motor
5—second rotation unit
51—second motor
6—control mechanism
61—chip
62—power source
63—mode switch
64—manual control switch
65—photograph-taking switch 66—video-taking switch
67—texture
7—damping shaft
8—mounting base
80—accommodation space
81—first inner sidewall
82—second inner sidewall
83—main body
831—first planar surface
832—second planar surface
84—locking button
85—locking hole
86—elastic member
87—first blocking member
88—second blocking member

DETAILED DESCRIPTION OF EMBODIMENTS

A clear and complete description of the technical scheme of the present invention is given below, in conjunction with the accompanying drawings. Apparently, the described embodiments are a part, but not all, of the embodiments of the present invention. All the other embodiments, derived by those skilled in the art on the basis of the embodiments described in the present invention without expenditure of creative labor, are included in the protection scope of the present invention.

In the description of the present invention, it needs to be noted that, terms such as "center", "above", "below", "left", "right", "vertical", "horizontal", "inside", "outside" refer to the orientation or positional relation based on the illustration of the drawings, which is merely for facilitating and simplifying the description of the present invention, not for indicating or implying that the referred apparatus or component must have a particular orientation or must be configured or operated in a particular orientation, therefore is not to be construed as a limitation towards the present invention. In addition, terms such as "first", "second", "third" are merely for the purpose of description, and are not to be construed as an indication or implication of relative importance thereof.

In the description of the present invention, it needs to be noted that, unless specifically defined or restricted otherwise, terms such as "mount", "interconnect", "connect" should be broadly construed, for example, they may be fixed connection or detachable connection or integral connection; they may be mechanical connection or electrical connection; they may be direct connection, or indirect connection via an intermediate medium, or internal communication between two units; they may be wireless connection, or wired connection. For those skilled in the art, the specific meaning of the aforementioned terms in the present invention can be understood according to specific situations thereof.

Furthermore, the technical features involved in the various embodiments of the present invention described below can be combined with one another as long as they do not conflict with one another.

Embodiment

Figure 1:
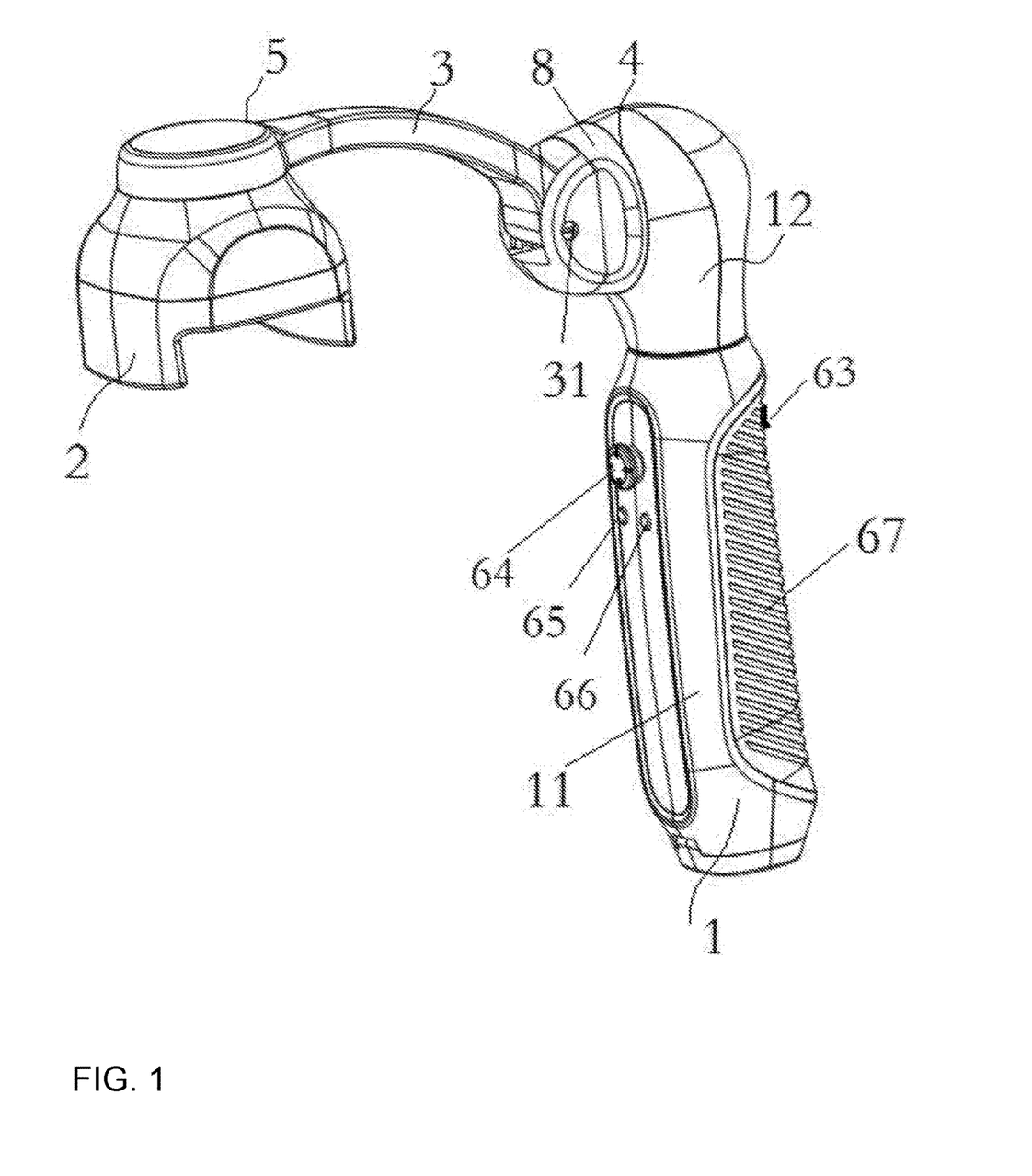
FIG. 1 is a schematic diagram of the overall structure of a handheld stabilizer in an embodiment of the present invention.
Figure 2:
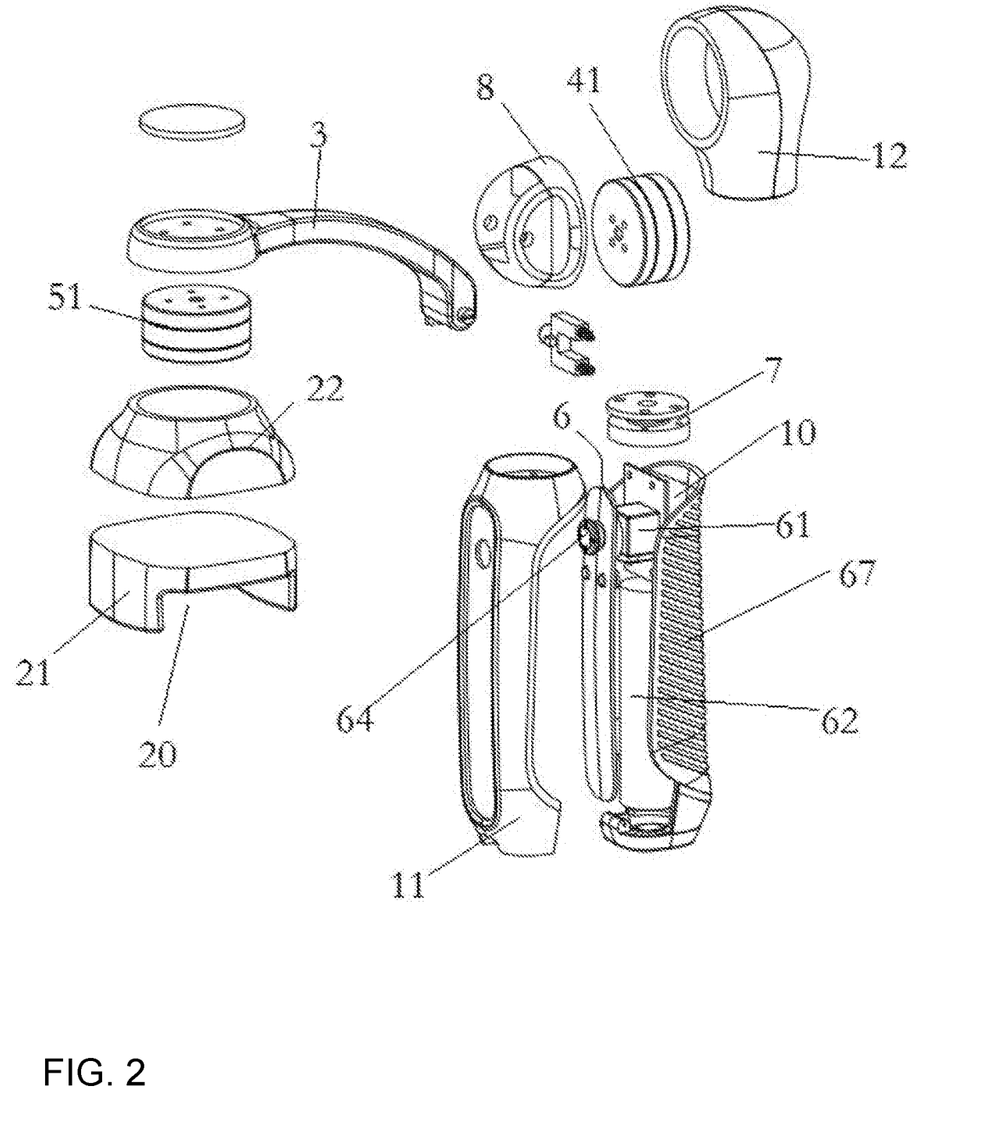
FIG. 2 is an exploded structural schematic diagram of components of FIG. 1.
Figure 3:
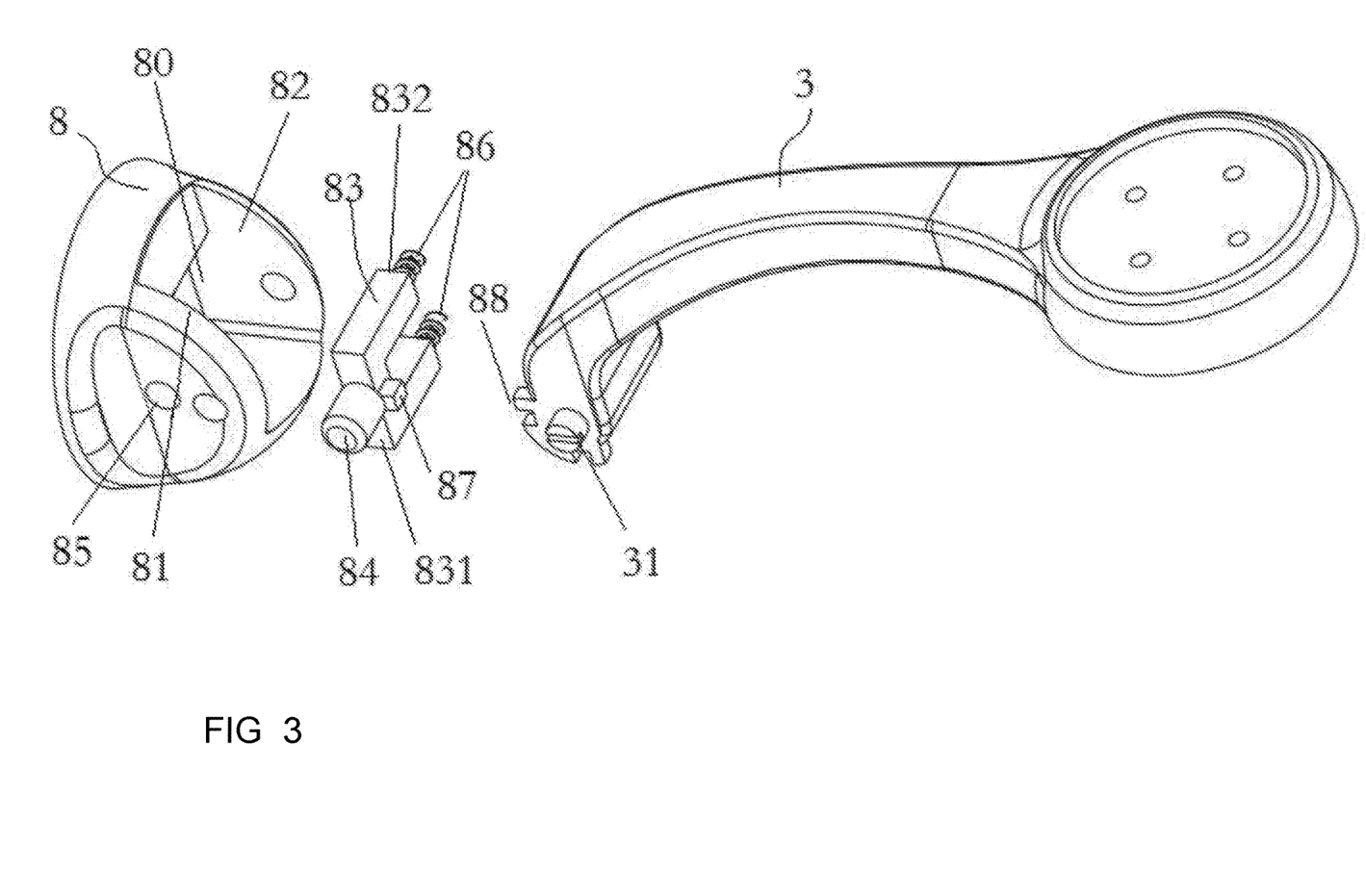
FIG. 3 is a structural schematic diagram of the locking mechanism in FIG. 1.

This embodiment provides a handheld stabilizer, as shown in FIGS. 1-3, comprising a handle 1, having a handheld portion 11 and a connecting portion 12 connected to the handheld portion 11; a holder 2 adapted for fastening a photographing device; a support rod 3, one end of which is connected to the connecting portion 12 in a rotatable manner by a first rotation unit 4 and the other end of which is connected to the holder 2 in a rotatable manner by a second rotation unit 5; a control mechanism 6 electrically connected to the first rotation unit 4 and the second rotation unit 5, and when receiving a location signal from the photographing device indicating that one or more human faces are not centered within the middle center (or may be another predefined location range, the middle center is illustrated as an example for description in this embodiment) of a display screen of the photographing device, the control mechanism 6 is able to control the first rotation unit 4 to drive the support rod 3 to rotate relative to the handle 1 and/or control the second rotation unit 5 to drive the holder 2 to rotate relative to the support rod 3, thereby adjusting the one or more human faces to a location centered within the middle center of the display screen of the photographing device.

In the handheld stabilizer of this embodiment, when the control mechanism 6 receives the human face location signal (indicating that one or more human faces are not centered within the middle center of the screen of the photographing device) from the photographing device, the operation of the first rotation unit 4 and/or the second rotation unit 5 can be controlled to adjust the one or more human faces to a location centered within the middle center of the screen of the photographing device, thereby realizing a photographing function that tracks human faces. As compared to prior arts, not only the operation is easy and not tiring, but also a good photographing effect can be achieved. When people use the handheld stabilizer of the present invention to do photographing, he/she is not required to look at the screen of the photographing device, and is only required to face the camera (such as a rear camera of a mobile device such as a cell phone) in order to take photos or videos with high quality.

The photographing device in this embodiment includes, but not limited to, a cell phone, a palm computer, a handheld game player, a tablet computer, a digital camera, a mini-type high definition motion camera, and other mobile photographing devices. The control mechanism 6 receives the location signal by Blue-tooth, wireless transmission, or data cable.

The control mechanism 6 comprises a chip 61, a power source 62, a mode switch 63 and a manual control switch 64, wherein the power source 62, the mode switch 63 and the manual control switch 64 are respectively electrically connected to the chip 61. In this embodiment, the power source 62 is a rechargeable lithium battery, which can be replaced by another type of battery according to requirements of those skilled in the art. The manual control switch 64 is universal joint switch that facilitates adjustment towards all directions.

The mode switch 63 is adapted for controlling the chip 61 to activate an automatic tracking mode or a manual tracking mode. When the chip 61 activates the automatic tracking mode, the chip 61 automatically controls the motion of the first rotation unit 4 and/or the second rotation unit 5 according to the received location signal. When the chip 61 activates the manual tracking mode, the chip 61 controls the motion of the first rotation unit 4 and/or the second rotation unit 5 by operation of the manual control switch 64.

Such arrangement has the following advantage: when there is no human face in the display screen of the photographing device, the manual tracking mode can be used to find a human face first, and then the automatic tracking mode can be activated to perform tracked photographing; of course, the manual tracking mode can also be used throughout the process to perform tracked photographing. Such arrangement makes the handheld stabilizer of the present invention have various operation methods suitable to be used by people having various preferences.

The control mechanism 6 further comprises a photograph-taking switch 65 adapted for controlling the photographing device to take a photograph, and a video-taking switch 66 adapted for controlling the photographing device to take a video. This makes the handheld stabilizer of the present embodiment capable of performing both photograph-taking function and video-taking function.

The support rod 3 is axially substantially perpendicular to the handle 1, and during the rotation of the support rod 3 driven by the first rotation unit 4 controlled by the control mechanism 6, the support rod 3 is always kept axially substantially perpendicular to the handle 3. When the first rotation unit 4 rotates the support rod 3, rotation adjustment can be in the left and right direction can be done to the photographing device mounted on the support rod 3 through the holder 2, thereby realizing automatic tracking in the left and right direction.

The holder 2 is axially substantially perpendicular to the support rod 3, and during the rotation of the holder 2 driven by the second rotation unit 5 controlled by the control mechanism 6, the holder 2 is always kept axially substantially perpendicular to the support rod 3. When the second rotation unit 5 rotates the holder 2, rotation adjustment in the high and low direction can be done to the photographing device mounted on the holder 2, thereby realizing automatic tracking in the high and low direction.

Figure 5:
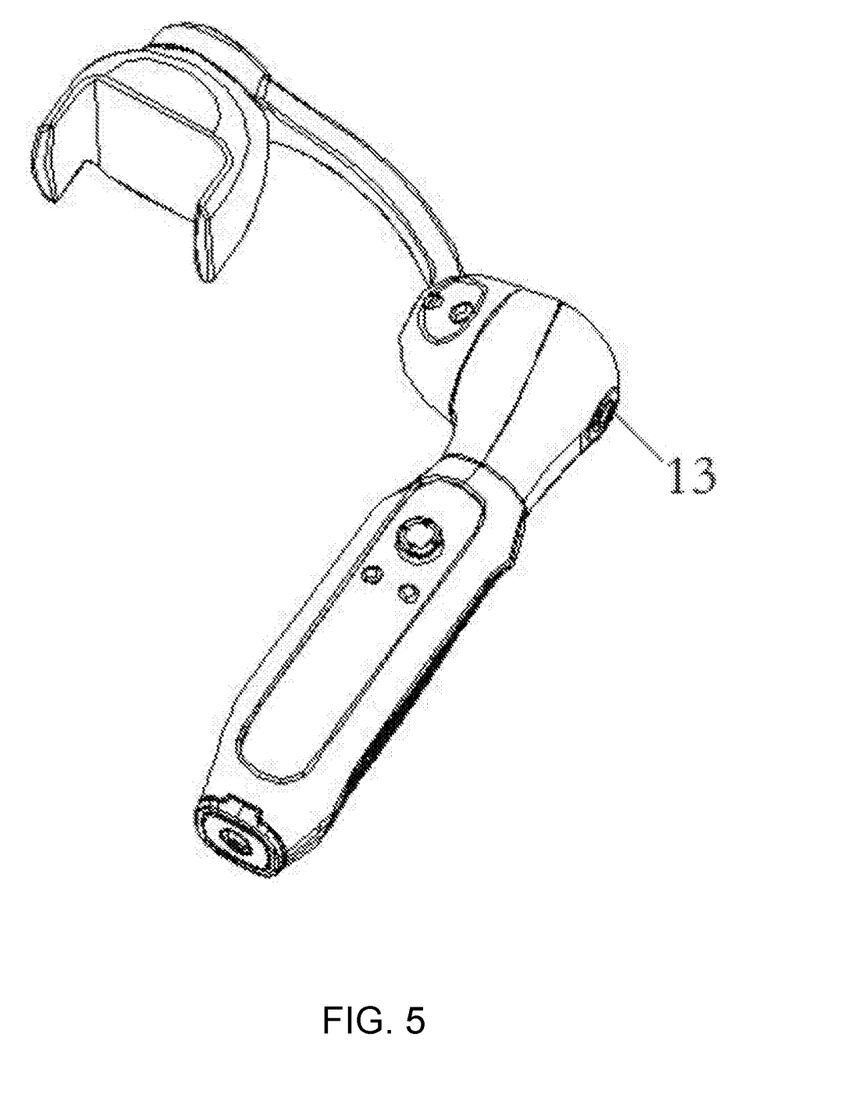
FIG. 5 is a stereogram of the handheld stabilizer of FIG. 1 from another viewing angle.

As shown in FIG. 5, on a side of the connecting portion 12 opposite the support rod 3, there is provided a threaded mounting hole 13 which is able to be connected with a bracket such as a tripod. This makes the handheld stabilizer of the present embodiment able to fastened on a tripod to do photographing.

The handheld portion 11 has a hollow inner chamber 10, the control mechanism 6 is mounted inside the hollow inner chamber, with the mode switch 63, the manual control switch 64, the photograph-taking switch 65 and the video-taking switch 66 provided on a side wall of the handheld portion 11.

One side of the handheld portion 11 is provided with texture 67 for handholding. The manual control switch 64, the photograph-taking switch 65 and the video-taking switch 66 is arranged on the opposite side of the texture 67. The mode switch 63 is arranged on the same side of the texture 67.

People usually hold the texture portion 67 with the four fingers except the thumb, and put the thumb on the opposite side. The arrangement of the present invention meets people's usual habits, and it is convenient to use the thumb to frequently operate one or more of the manual control switch 64, the photograph-taking switch 65 and the video-taking switch 66. The mode switch 63 with a lower operation frequency is arranged on the same side of the texture 67, so as to avoid crowdedness caused by arranging all the switches on the opposite side of the texture 67, and the other four fingers can be used for operation of mode switching.

The handheld portion 11 is connected to the connecting portion 12 in a rotatable manner by a damping shaft 7. This makes it convenient to adjust the rotation angle of connecting portion 12 connected with the support rod 3 relative to the handheld portion 11, for adjustment into the most comfortable holding posture.

The handheld stabilizer further comprises a mounting base 8 connected to the connecting portion 12 in a rotatable manner by the first rotation unit 4, with one end of the support rod 3 mounted on the mounting base 8 in a rotatable manner by a rotation shaft 31.

Figure 4:
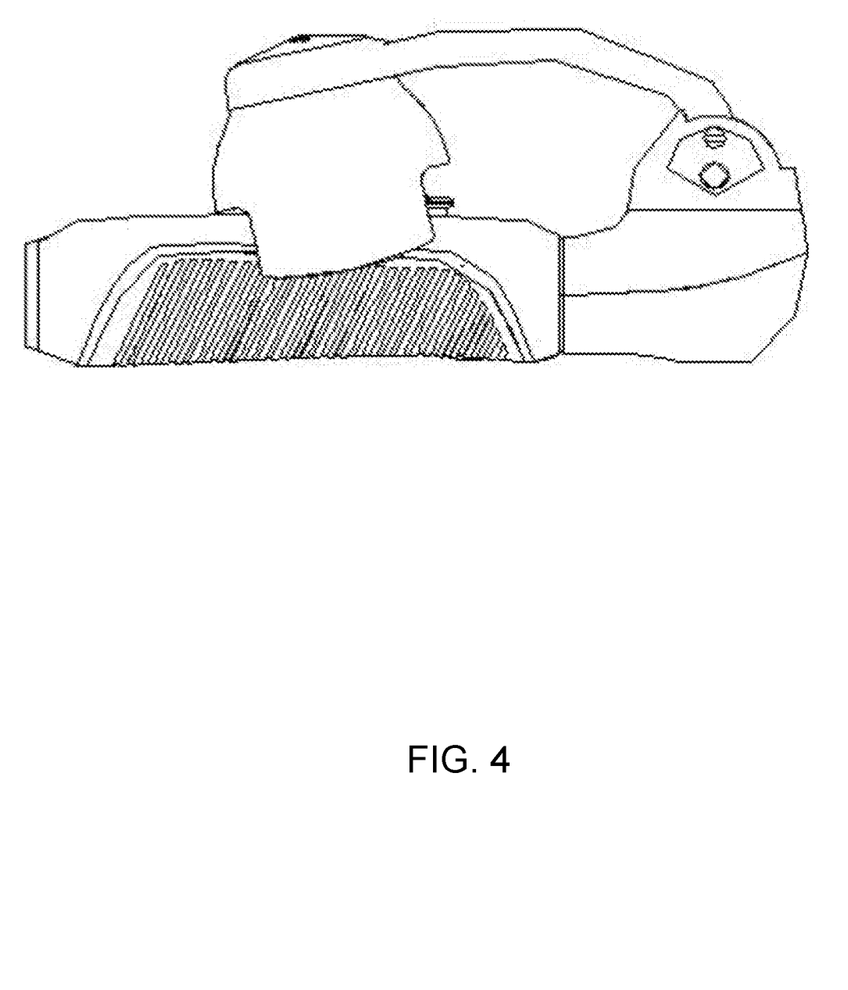
FIG. 4 is a structural schematic diagram of the handheld stabilizer of FIG. 1 in a folded state.

The support rod 3 has a first mounting position and a second mounting position on the mounting base 8. At the first mounting position, the support rod 3 is axially substantially perpendicular to the handle 1, thereby forming a working state. At the second mounting position, the support rod 3 is axially substantially parallel to the handle 1, thereby forming a folded state.

At the first mounting position, the support rod 3 is axially substantially perpendicular to the handle 1, which facilitates photographing. At the second mounting position, the support rod 3 is axially substantially parallel to the handle 1, the entire handheld stabilizer occupies little space at this state, which is easy to be accommodated and beneficial for protecting the handheld stabilizer from being damaged due to collision or compression (as shown in FIG. 4).

The handheld stabilizer further comprises a locking mechanism adapted for locking the support rod at the first mounting position or at the second mounting position.

The locking mechanism comprises: an accommodation space 80 on the mounting base 8, with a first inner sidewall 81 and a second inner sidewall 82 spaced in the axial direction of the rotation shaft 3; a main body 83 mounted inside the accommodation space 80 and provided with a first planar surface 831 facing the first inner sidewall 81 and a second planar surface 832 facing the second inner sidewall 82, the distance between the first planar surface 831 and the second planar surface 832 being shorter than the distance between the first inner sidewall 81 and the second inner sidewall 82; a locking button 84 mounted on the first planar surface 831; a locking hole 85 provided in the mounting base 8 and in communication with the accommodation space 80 for the locking button 84 to extend out therefrom; an elastic member 86 mounted between the second planar surface 832 and the second inner sidewall 82; a first blocking member 87 provided on the main body 83; at least two second blocking members 88 provided on the support rod 3. When the locking button 84 is pressed, the first blocking member 87 breaks away from the second blocking member 88 to render the support rod 3 freely rotatable around the rotation shaft 31 while the elastic member 86 is being compressed. The first blocking member 87 is aligned with one of the second blocking members 88 when the support rod 3 arrives at the first mounting position or the second mounting position, and then by releasing the locking button 84, the main body 83 is moved under an elastic force acted by the elastic member 86 so as to move the first blocking member 87 into engagement with the second blocking member 88, thereby locking the support rod 3 at the first mounting position or at the second mounting position.

In this embodiment, the first blocking member 87 is a blocking tooth, the second blocking members 88 are blocking grooves formed for receiving the blocking tooth therein, and the blocking grooves each have two opposite blocking surfaces distributed along a circumferential direction around the rotation shaft 31.

The holder 2 is provided with a holding slot 20 for fastening the photographing device, and when the support rod 3 is at the second mounting position, the holding slot 20 faces the handle 1 and receives part of the handle 1 therein.

The holder 2 comprises a holding member 21 provided with the holding slot 20, as well as a holder base 22 connected to the support rod 3 in a rotatable manner by the second rotation unit 5.

The operation method of the handheld stabilizer in this embodiment is as follows:

I. Automatic Photographing Mode

Figure 6:
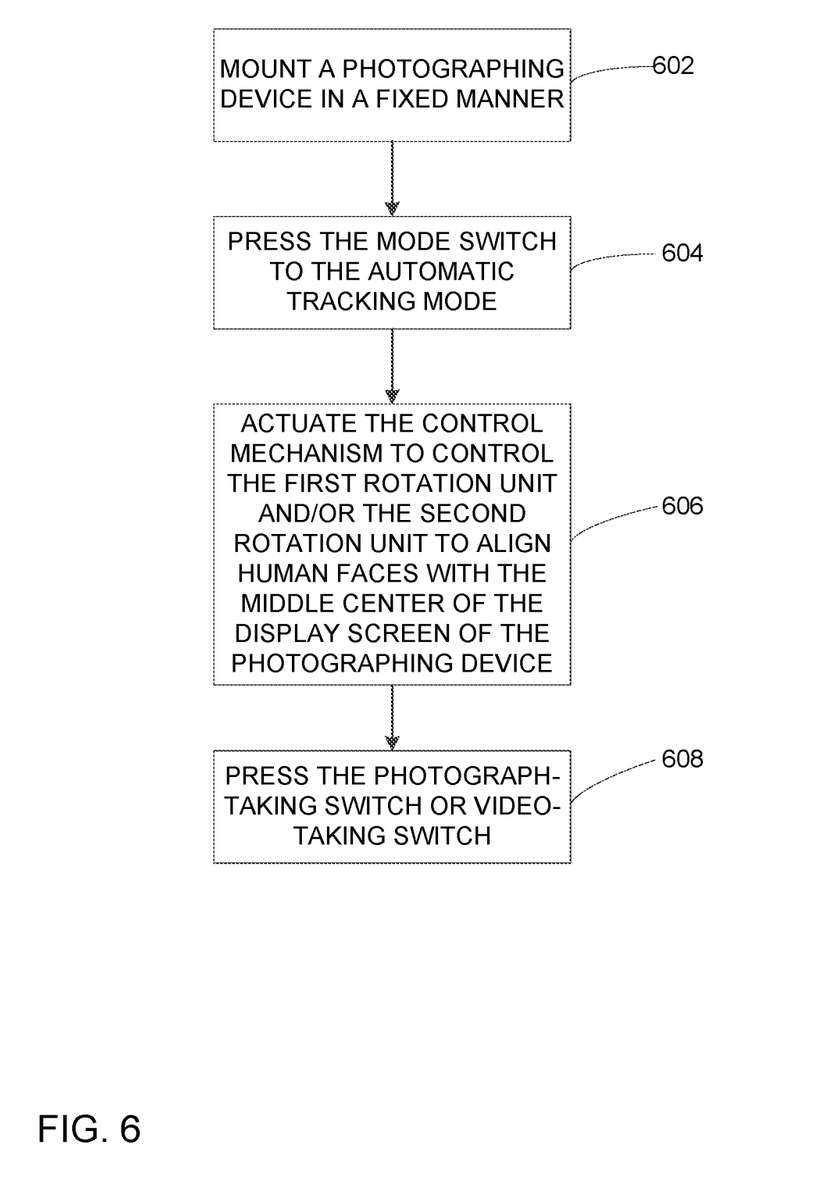
FIG. 6 is a flow chart illustrating an automatic photographing mode according to one embodiment of the invention.

Referring to FIG. 6, at 602, mounting a photographing device in a fixed manner in the holding slot 20 of the holder 2, holding the handheld portion 11 by hand, and placing a camera of the photographing device to be facing the photographed person(s);

At 604, pressing the mode switch 63, so as to switch into the automatic tracking mode. At 606, actuating the control mechanism 6 to control the first rotation unit 4 and/or the second rotation unit 5 to adjust the position of the photographing device, so as to adjust, the center(s) of one or mere human faces of the photographed person(s) to be aligned with the middle center of the display screen of the photographing device;

At 608, pressing the photograph-taking switch 65 or pressing the video-taking switch 66, so as to take pictures or videos.

II. Manual Photographing Mode

Figure 7:
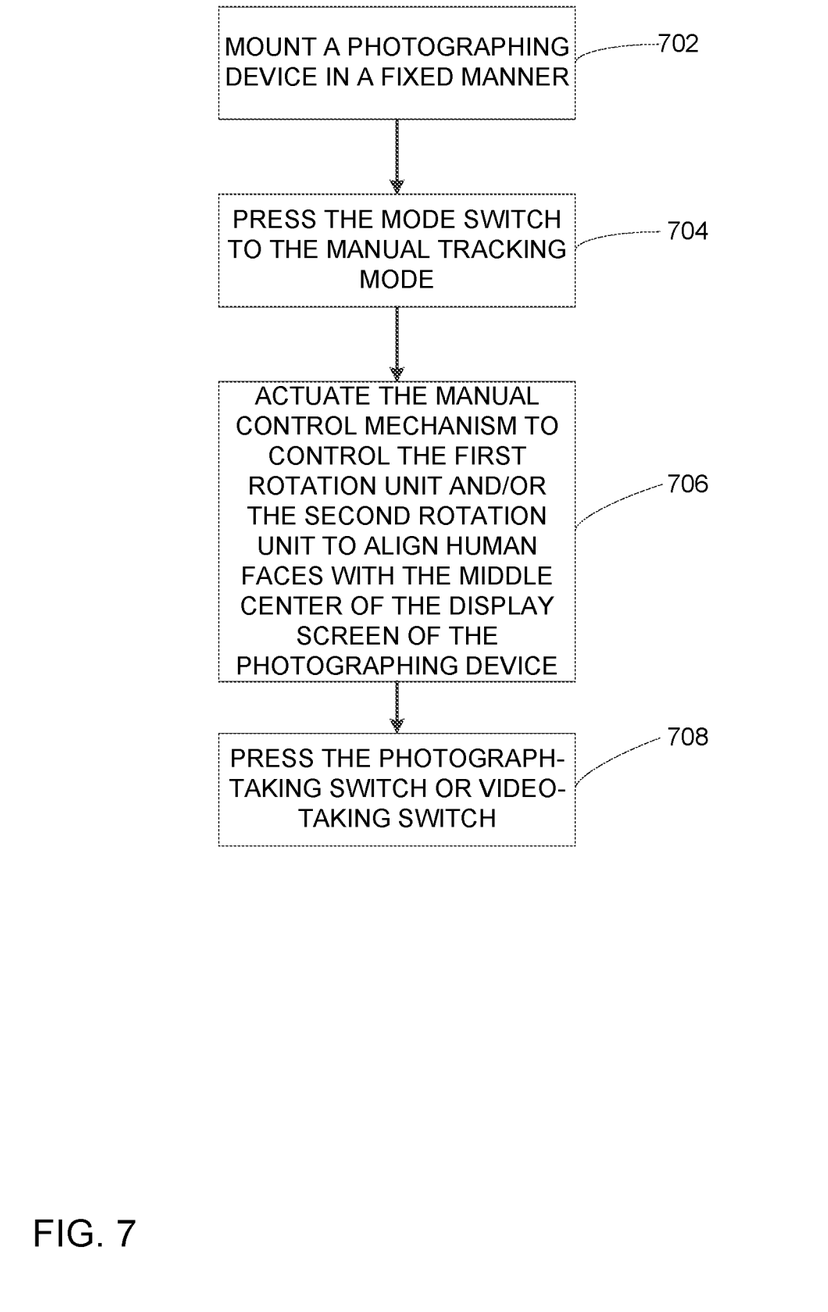
FIG. 7 is a flow chart illustrating a manual photographing mode according to one embodiment of the invention.

Referring now to FIG. 7, at 702, mounting a photographing device in a fixed manner in the holding slot 20 of the holder 2, holding the handheld portion 11 by hand, and placing a camera of the photographing device to be facing the photographed person(s);

At 704, pressing the mode switch 63, so as to switch into the manual tracking mode. At 706, operating the manual control switch 64 to control the first rotation unit 4 and/or the second rotation unit 5 to adjust the position of the photographing device so as to adjust the center(s) of one or more human faces of the photographed person(s) to be aligned with the middle center of the display screen of the photographing device;

At 708, pressing the photograph-taking switch 65 or pressing the video-taking switch 66, so as to take a picture or a video.

III. Manual Plus Automatic Photographing Mode

Figure 8:
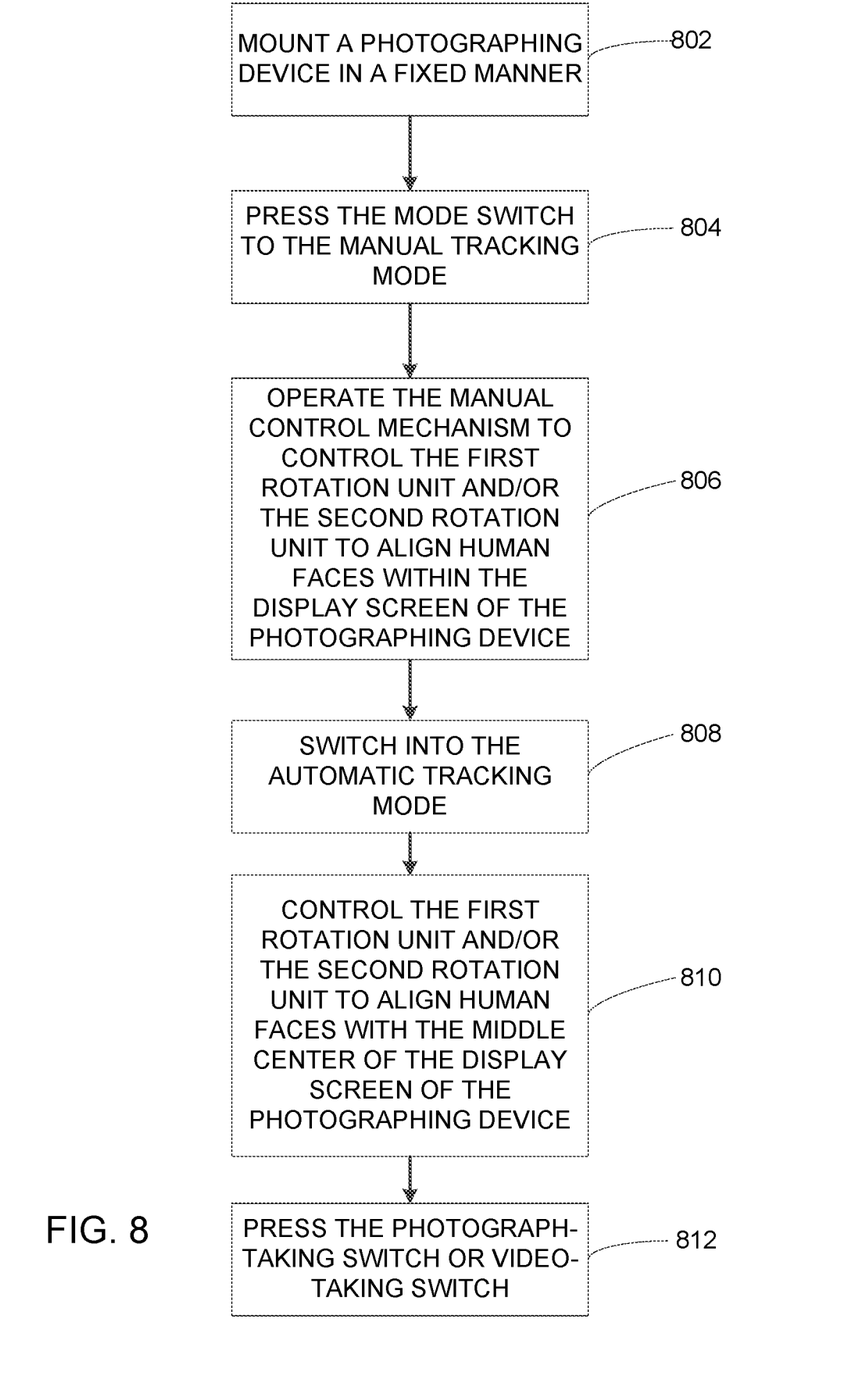
FIG. 8 is a flow chart illustrating a manual and plus automatic photographing mode according to one embodiment of the invention.

Referring now to FIG. 8, at 802, mounting a photographing device in a fixed manner in the holding slot 20 of the holder 2, holding the handheld portion 11 by hand, and placing a camera of the photographing device to be facing the photographed person(s);

At 804, pressing the mode switch 63, so as to switch into the manual tracking mod. At 806 operating the manual control switch 64 to control the first rotation unit 4 and/or the second rotation unit 5 to adjust the position of the photographing device, so as to put one or more human faces of the photographed person(s) onto the display screen of the photographing device;

At 808, pressing the mode switch 63, so as to switch into the automatic tracking mode. At 810, actuating the control mechanism 6 to control the first rotation unit 4 and/or the second rotation unit 5 to adjust the position of the photographing device, so as to adjust the centers) of one or more human faces of the photographed person(s) to be aligned with the middle center of the display screen of the photographing device;

At 812, pressing the photograph-taking switch 65 or pressing the video-taking switch 66, so as to take pictures or videos.

Apparently, the aforementioned embodiments are merely examples illustrated for clearly describing the present application, rather than limiting the implementation ways thereof. For those skilled in the art, various changes and modifications in other different forms can be made on the basis of the aforementioned description. It is unnecessary and impossible to exhaustively list all the implementation ways herein. However, any obvious changes or modifications derived from the aforementioned description are intended to be embraced within the protection scope of the present invention application.

What is claimed is:

1. A handheld stabilizer comprising
   a handle (1), having a handheld portion (11) and a connecting portion (12) connected to the handheld portion (11);
   a ball head mechanism, mounted between the connecting portion (12) and a photographing device and adapted for adjusting the position of the photographing device,
   a holding slot (20) for fixing the photographing device, and the ball head mechanism includes:
   a holder (2) for stabilizing the photographing device;
   a support rod (3) with one end, through a first rotation unit (4), rotatably connected to the connecting portion (12) and the other end, through a second rotation unit (5), rotatably connecting to the holding slot (2);
   a driving mechanism adapted for driving movements of the ball head mechanism;
   a mounting base (8);
   wherein the mounting base (8), through the first rotation unit (4), is rotatably connected to the connecting portion (12);
   wherein one end of the support rod (3) is rotatably disposed at the mounting base (8) through a rotation shaft (31);
   wherein the support rod (3) disposed at the mounting base (8) comprises at least a working state in a first mounting position and a folded state in a second mounting position; and
   a control mechanism (6) adapted for controlling a motion of the ball head mechanism after receiving a location signal from the photographing device indicating that one or more human faces are not centered within a predefined location range in a screen of the photographing device, wherein the control mechanism (6) adjusts a position of the photographing device to cause the one or more human faces to be centered within the predefined location range in the screen of the photographing device.

2. The handheld stabilizer according to claim 1, wherein the control mechanism (6) is adapted for receiving the location signal by a network card for BLUETOOTH, wireless, and wired cable.

3. The handheld stabilizer according to claim 1, wherein a rotational axis of the first rotation unit (4) is not parallel to a rotation axis of the second rotation unit (5); and
   when controlling the movements of the ball head mechanism, wherein the control mechanism (6) is adapted for controlling the first rotation unit (4) to drive the support rod (3) to rotate relative to the handle (1), and/or controlling the second rotation unit (5) to drive the holder (2) to rotate relative to the support rod (3).

4. The handheld stabilizer according to claim 3, wherein the control mechanism (6) comprises:
   a chip (61) and a power source (62), a mode switch (63) and a manual control switch (64) that are electrically connected to the chip (61);
   wherein the mode switch (63) is adapted for controlling the chip (61) to activate an automatic tracking mode or a manual tracking mode;
   wherein when the chip (61) activates the automatic tracking mode, the chip (61) is adapted for automatically controlling motions of the first rotation unit (4) and/or the second rotation unit (5) according to the received location signal; and wherein when the chip (61) activates the manual tracking mode, the chip (61) is adapted for controlling the motions of the first rotation unit (4) and/or the second rotation unit (5) by operation of the manual control switch (64).

5. The handheld stabilizer according to claim 4, wherein the control mechanism (6) further comprises a photography-taking switch (65) adapted for controlling the photographing device to take a photograph, and a video-taking switch (66) adapted for controlling the photographing device to take a video.

6. The handheld stabilizer according to claim 5, wherein the handheld portion (11) comprises a hollow inner chamber (10), wherein the control mechanism (6) is mounted inside the hollow inner chamber (10), wherein one or more of the following are disposed at a side wall of the handheld portion (11): the mode switch (63), the manual control switch (64), the photograph-taking switch (65) and the video-taking switch (66).

7. The handheld stabilizer according to claim 5, wherein one side of the handheld portion (11) is provided with texture (67) for handholding, and one or more of following are disposed on the opposite side of the handheld portion (11) as the texture (67): the manual control switch (64), the photograph-taking switch (65) the video-taking switch (66); or wherein the mode switch (63) is arranged on the same side of the texture (67).

8. The handheld stabilizer according to claim 3, wherein the support rod (3) is axially substantially perpendicular to the handle (1), and, during the rotation of the support rod (3) driven by the first rotation unit (4) controlled by the control mechanism (6), the support rod (3) is kept axially substantially perpendicular to the handle (1).

9. The handheld stabilizer according to claim 3, wherein the holder (2) is axially substantially perpendicular to the support rod (3), and during the rotation of the holder (2) driven by the second rotation unit (5) controlled by the control mechanism (6), the holder (2) is kept axially substantially perpendicular to the support rod (3).

10. The handheld stabilizer according to claim 3, wherein, the handheld portion (11) is connected to the connecting portion (12) in a rotatable manner by a damping shaft (7).

11. The handheld stabilizer according to claim 3, wherein
at the first mounting position, the support rod (3) is axially substantially perpendicular to the handle (1), thereby forming the working state; and
at the second mounting position, the support rod (3) is axially substantially parallel to the handle (1), thereby forming the folded state.

12. The handheld stabilizer according to claim 11, further comprising a locking mechanism adapted for locking the support rod (3) at the first mounting position or at the second mounting position; wherein the locking mechanism comprises:

an accommodation space (80) disposed at the mounting base (8), with a first inner sidewall (81) and a second inner sidewall (82) spaced in an axial direction of the rotation shaft (31);
a main body (83), mounted inside the accommodation space (80) and provided with a first planar surface (831) facing the first inner sidewall (81) and a second planar surface (832) facing the second inner sidewall (82), the distance between the first planar surface (831) and the second planar surface (832) being shorter than the distance between the first inner sidewall (81) and the second inner sidewall (82);
a locking button (84), mounted on the first planar surface (831);
a locking hole (85), provided in the mounting base (8) and in communication with the accommodation space (80) for the locking button (84) to extend out therefrom;
an elastic member (86), mounted between the second planar surface (832) and the second inner sidewall (82);
a first blocking member (87), provided on the main body (83);
at least two second blocking members (88), provided on the support rod (3);
when the locking button (84) is pressed, the first blocking member (87) is adapted for breaking away from the second blocking member (88) to render the support rod (3) freely rotatable around the rotation shaft (31) while the elastic member (86) is being compressed; and
wherein the first blocking member (87) is aligned with the second blocking member (88) when the support rod (3) arrives at the first mounting position or the second mounting position, and, by releasing the locking button (84), the main body (83) is moved under an elastic force acted by the elastic member (86) so as to move the first blocking member (87) into engagement with the second blocking member (88), thereby locking the support rod (3) at the first mounting position or at the second mounting position.

13. The handheld stabilizer according to claim 12, the first blocking member (87) comprises a blocking tooth, wherein the second blocking members (88) are blocking grooves formed for receiving the blocking tooth therein, and the blocking grooves each has two opposite blocking surfaces distributed along a circumferential direction around the rotation shaft (31).

14. The handheld stabilizer according to claim 11, wherein the holder (2) is provided with a holding slot (20) for fastening the photographing device, and when the support rod (3) is at the second mounting position, the holding slot (20) faces the handle (1) and receives part of the handle (1) therein.

15. The handheld stabilizer according to claim 14, wherein the holder (2) comprises a holding member (21) provided with the holding slot (20), and a holder base (22) connected to the support rod (3) in a rotatable manner by the second rotation unit (5).

* * * * *